United States Patent [19]
Fuss et al.

[11] Patent Number: 5,914,369
[45] Date of Patent: *Jun. 22, 1999

[54] PROCESS FOR THE PREPARATION OF POLYVINYL ALCOHOL

[75] Inventors: Robert Fuss, Kelkheim; Hans-Karl Mueller, Kelsterbach, both of Germany

[73] Assignee: Clariant GmbH, Frankfurt, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/789,465

[22] Filed: Jan. 27, 1997

[30] Foreign Application Priority Data

Jan. 27, 1996 [DE] Germany ............ 196 02 901

[51] Int. Cl.⁶ .................................. C08F 8/00
[52] U.S. Cl. ................ 525/62; 525/56; 525/61
[58] Field of Search .................................. 525/62

[56] References Cited

U.S. PATENT DOCUMENTS

| | | | |
|---|---|---|---|
| 2,642,419 | 6/1953 | Waugh et al. | 525/62 |
| 2,643,994 | 6/1953 | Germain | 525/62 |
| 2,734,048 | 2/1956 | Bristol et al. | 525/62 |
| 2,779,752 | 1/1957 | Vining | 260/91.3 |
| 2,950,271 | 8/1960 | Snyder . | |
| 3,072,624 | 1/1963 | Akaboshi et al. | 525/62 |
| 3,278,505 | 10/1966 | Kominami . | |
| 3,300,460 | 1/1967 | Vacca | 260/89.1 |
| 3,386,981 | 6/1968 | Akaboshi et al. | 260/91.3 |
| 3,884,892 | 5/1975 | Winkler et al. . | |
| 4,338,405 | 7/1982 | Saxton | 525/60 X |

FOREIGN PATENT DOCUMENTS

| | | | |
|---|---|---|---|
| 054 716 | 10/1981 | European Pat. Off. . | |
| 763840 | 2/1955 | Germany . | |
| 2304684 | 7/1977 | Germany . | |
| 3000750 | 7/1981 | Germany . | |
| 891691 | 12/1981 | Russian Federation . | |
| 891691 | 12/1981 | U.S.S.R. . | |
| 0993893 | 6/1965 | United Kingdom | 525/62 |
| 1168757 | 10/1969 | United Kingdom | 525/62 |
| 1224113 | 3/1971 | United Kingdom . | |

OTHER PUBLICATIONS

XP–002052948–Database WPI, Section Ch, Week 8243, Derwent Publications Ltd., London, GB; Class A14, AN 82–92168E (1981).

*Primary Examiner*—Judy M. Reddick
*Attorney, Agent, or Firm*—Connolly and Hutz

[57] ABSTRACT

The reaction of polyvinyl acetate in methanolic solution with methanolic sodium hydroxide at a temperature between 10° C. and 65° C. with stirring at a stirring speed of from 5 to 200 rpm with a stirrer which has a ratio of stirrer diameter (d) to container diameter (D) in the range of $0.6 < d/D < 0.999$ leads to a homogeneously hydrolyzed polyvinyl alcohol.

18 Claims, No Drawings

PROCESS FOR THE PREPARATION OF POLYVINYL ALCOHOL

The present invention relates to a process for the preparation of polyvinyl alcohol having a homogeneous degree of hydrolysis by hydrolytic cleavage of suitable polyvinyl acetates under reaction conditions where the gel phase which usually occurs is suppressed.

The hydrolysis of polyvinyl acetate to polyvinyl alcohol is carried out on a large industrial scale preferably by continuous process. The so-called belt process, which is described, for example, in U.S. Pat. No. 3,278,505 and GB-A 1 224 113, is used for this purpose. A methanolic solution of polyvinyl acetate is mixed with methanolic sodium hydroxide solution in a suitable pipe system by means of a positive mixer and is transferred to a conveyor belt. The belt is designed in such a way that it forms, at the feed point, a type of trough which flattens further along. The methanolic solution fed begins to gel after a short time and is generally completely solid at the end of the belt. At the end of the belt, the solid polyvinyl alcohol is fed to a mill, comminuted and then, if required, washed with a methanolic wash solution containing acetic acid to stop the hydrolysis reaction. After appropriate working up and drying, the product is obtained as a solid.

If the preparation process is operated by a batchwise method, as described, for example, in DE-B 23 04 684, the hydrolysis takes place in a vessel in which methanolic sodium hydroxide solution is introduced into the polyvinyl acetate solution and mixing is carried out. The gel phase forms at an earlier or later stage depending on the concentration of the sodium hydroxide solution, and the stirrer then usually has to be switched off to protect it from damage by overloading. The polyvinyl alcohol prepared in this manner is now present as solid gel in the vessel and is slowly dissolved by passing in steam. Depending on the batch size, this process can easily take 20 hours or more. The product is finally obtained as an aqueous solution.

A disadvantage of the continuous process is its high capital requirement. In addition, the apparatus for this process is not very flexible with regard to changing over to other product types since the apparatus must first be run completely empty and started up again appropriately after cleaning. Furthermore, stopping the reaction by means of acetic acid in the scrubbing tower presents a problem in the case of some types of polyvinyl alcohol. In the case of low-viscosity polyvinyl alcohols having a low molar mass, this reaction step results in the proportion of fine particles, which is always particularly high in such types, being washed out and entering the wastewater treatment plant via the aqueous liquid phase. This leads to a high COD value (Chemical Oxygen Demand) for such wastewaters, which is reflected in high wastewater costs. Moreover, the significant loss of material leads to low yields. Owing to this problem, the belt process is more suitable for polyvinyl alcohols which have a higher molar mass and constitute high-capacity product types.

The disadvantages of the batchwise process lie in the product quality of the polyvinyl alcohol obtained. Although the time until gel formation may be influenced by the concentration of the sodium hydroxide solution and hence the time for uniform thorough mixing of the added catalyst solution may be increased, it is frequently observed that the product obtained is not uniform. There is a distribution of different degrees of hydrolysis between about 96 and 100%. This is particularly disadvantageous if the degree of hydrolysis of significant fractions is 100% since these fractions go into solution in water only with very great difficulty and give rise to the formation of swollen gel particles. The products have different refractive indices within a solution since they are not completely homogeneously dissolved. Particularly in downstream processing steps, the swollen product particles substantially impair the processing and the product quality.

The patent SU-B 891 691 describes a process for the preparation of polyvinyl alcohol, in which the formation of the gel phase is suppressed. The claimed preparation process involving alkaline hydrolysis of polyvinyl acetate in methanol is carried out in a high-capacity apparatus having a stirrer, wherein the reaction is carried out in three stages or phases. In the first phase, stirring of the reaction medium in the total apparatus volume at a shear rate of from 50 to 100 $s^{-1}$ is ensured for from 20 to 90 minutes until from 40 to 45% of acetate groups remain, and in the second phase the medium enters for 10 to 15 minutes, a reaction zone which is limited in terms of volume and in which thorough stirring at a shear rate of from 200 to 500 $s^{-1}$ is ensured; in the final stage, stirring and homogenization are carried out for 100 to 200 minutes at a shear rate of from 50 to 100 $s^{-1}$.

It was therefore the object of the present invention to develop a one-stage process for the preparation of polyvinyl alcohol which uses simple apparatus, has maximum flexibility with regard to various polyvinyl alcohol types and permits the preparation of products having a substantially uniform degree of hydrolysis.

It has been found that it is possible to suppress the formation of the gel phase in the hydrolysis of polyvinyl acetate, without special pretreatments and/or aftertreatments having to be carried out, simply by using suitable stirrers or by suitable stirring in a one-stage process within a single reactor.

The present invention relates to a process for the preparation of polyvinyl alcohol by reacting polyvinyl acetate in methanolic solution with methanolic sodium hydroxide at a temperature between about 10° C. and about 65° C. with stirring at a stirring speed of from about 5 to about 200 rpm, preferably from about 10 to about 100 rpm, particularly preferably from about 30 to about 80 rpm, with a stirrer which has a ratio of stirrer diameter (d) to container diameter (D) in the range of about 0.6<d/D< about 0.999, particularly preferably in the range of about 0.85<d/D< about 0.95.

The stirrers used according to the invention are distinguished by the fact that, in the highly viscous phase, they stir the reaction volume so effectively that a cohesive gel phase does not form but instead a type of slurry is obtained. The stirrers may be, for example, helical ribbon impellers or helical ribbon-type stirrers, anchor stirrers or anchor-like stirrers and multistage bar-type stirrers. Stirrers of the type PARAVIS® (from Ekato) or ALPHA-RÜHRER® (from Stelzer) may be mentioned here by way of example. The stirrers may additionally be modified by measures, for example by mounting an additional screw stirrer or a crossbeam stirrer or bar-type stirrer on the same shaft. The stirring effect can also be achieved by a plurality of stirrer shafts, for example by means of a coaxial stirrer, if at least one of the stirrers fulfils the abovementioned conditions.

The process according to the invention is preferably carried out at a temperature between about 20° C. and about 60° C., in particular between about 30° C. and about 55° C., under a pressure of, preferably, from about 50 to about 150 kPa, in particular under atmospheric pressure. Carrying out the hydrolysis at elevated temperature means that the amount of sodium hydroxide used can be kept very small but the desired degree of hydrolysis is nevertheless reached.

The amount of sodium hydroxide used is preferably from about 0.05 to about 10% by weight, in particular from about 0.1 to about 2% by weight, based on the polyvinyl acetate used.

The hydrolysis, according to the invention, of the polyvinyl acetate can preferably be carried out using a solids content of from about 1 to about 80% by weight, in particular from about 20 to about 70% by weight, particularly preferably from about 30 to about 60% by weight.

The weight average molar mass ($M_w$) of the polyvinyl acetate used is preferably in the range from about 1,000 to about 100,000 g/mol, in particular in the range from about 1,000 to about 60,000 g/mol, particularly preferably in the range from about 2,000 to about 30,000 g/mol.

The reaction mixture is kept in motion by stirring the materials so that formation of the gel cannot occur. The minimum required stirrer speed for avoiding the formation of the gel phase depends to a very great extent on the respective reaction condition, such as concentration of the solution, solids content, temperature, concentration of the sodium hydroxide and molar mass of the polyvinyl acetate used. In the course of the reaction, the viscosity of the solution increases, this being measurable from the power consumption of the stirrer, and methanol-insoluble small particles of the resulting polyvinyl alcohol form and convert the reaction medium into a sort of slurry. Lump formation by larger aggregates is not observed. The reaction batch is always readily stirrable and flowable since no gel structures are built up. About 20 to 30 minutes after the addition of the sodium hydroxide, the onset of syneresis results in a reduction in the viscosity, with the result that stirring is facilitated. After the onset of syneresis, stirring may, optionally be interrupted since gel formation now no longer occurs. In this case, the solid simply begins to settle out.

The material thus obtained is homogeneously hydrolyzed so that there is no scatter in the degree of hydrolysis. No coarse fractions are present. Furthermore, owing to the homogeneous reaction, no extremely finely divided fractions are formed. Filtration is thus possible without problems and no material is discharged with the wash solution, thus avoiding a serious problem of the continuous process whereby the particle sizes, too, fall below an acceptable value at low molar masses. The problems which occur in the known process, such as low yields due to the loss of finely divided fractions, pipe blockages and temperature inhomogeneities, do not occur in the process according to the invention. Furthermore, homogenization of the resulting polyvinyl alcohol by subsequent milling is not required after the process according to the invention.

For further processing, the stirring is usually continued and steam distillation can be started a short time after the onset of syneresis. The polyvinyl alcohol is completely and rapidly dissolved, owing to the large surface area.

EXAMPLES

The parts and percentages stated in the Examples are based on weight, unless stated otherwise.

A typical hydrolysis experiment is as follows:

A polyvinyl acetate whose 10% strength methanolic solution had a viscosity of from 1.0 to 5.0 mPa.s (measured according to DIN 53015, Höppler viscometer) was used.

The experiments were carried out in a heatable stirred 30 l glass vessel (nominal diameter 300) without baffles. The solids content (polymer) was between 20 and 65% by weight. Unless stated otherwise, the hydrolyses were carried out with 1% strength NaOH, based on solid in the solution, added in the form of a 10% strength methanolic sodium hydroxide solution. The temperature was initially 30° C.

Example 1

The transparent and colorless polyvinyl acetate used had the following specifications:

Viscosity (10% strength in methanol, measured according to DIN 53015, Höppler falling-ball viscometer): 1.74 mPa.s Molar Mass (GPC)

$M_w$ (weight average)=23,400 g/mol $M_n$ (number average)=8,250 g/mol

Stirrer

Helical ribbon impeller with inner screw, d=270 mm, and bottom stirrer

| | |
|---|---|
| Vessel diameter (D): | 300 mm |
| Ratio: | d/D = 0.9 |

Product

Volume of content 20 l (h/D=1)

Solids content 40%

The container filled with 18 kg of methanolic polyvinyl acetate solution was thermostated at 30° C. For the purpose of thorough mixing, the stirrer speed was 80 rpm with the introduction of 792 g of 10% strength methanolic sodium hydroxide solution. After 2 minutes, the stirrer speed was decreased to 60 rpm. The power consumption of the stirrer increased slowly and reached its maximum about 20 minutes after the addition of the methanolic sodium hydroxide solution. The temperature in the container increased to about 45° C. With the onset of syneresis, the power consumption declined noticeably. About 30 minutes after the addition of the methanolic sodium hydroxide solution, the introduction of steam started. Increasing the vessel temperature from the outside to about 60° C. prevented too much steam from condensing and the level of fill from being exceeded. The methanol was distilled off and the polyvinyl alcohol was completely dissolved after not more than 1.5 to 2 hours.

The product thus obtained had the following specification:

| Specification | Value | Unit |
|---|---|---|
| Solid | 15.07 | % |
| Residual methanol content | 0.71 | % |
| Degree of hydrolysis (DH) | 98.8 | mol % |
| Ester number | 15.05 | mg KOH/g |
| Viscosity (4% strength in water) | 2.61 | mPa · s |

Example 2

The transparent and colorless polyvinyl acetate used had the following specifications:

Viscosity (10% strength in methanol, measured according to DIN 53015, Höppler falling-ball viscometer): 1.66 mpa.s

| | |
|---|---|
| Molar mass (GPC): | $M_w$ = 22,000 g/mol |
| | $M_n$ = 9,000 g/mol |

Stirrer

Anchor stirrer with inner screw, d=700 mm, and bottom stirrer

| | |
|---|---|
| Maximum power input: | 17.5 kW/m³ |
| Vessel diameter (D): | 964 mm |
| Ratio: | d/D = 0.73 |

Product

Volume of fill 635 l

Solids content 40%

The container filled with 543 kg of methanolic polyvinyl acetate solution was thermostated at 30° C. For the purpose of thorough mixing, the stirrer speed was 80 rpm with introduction of 23.9 kg of 10% strength methanolic sodium hydroxide solution. After 2 minutes, the stirrer speed was reduced to 60 rpm. The power consumption of the stirrer increased slowly and reached its maximum about 20 minutes after the addition of the methanolic sodium hydroxide solution. The temperature in the container increased to about 45° C. With the onset of syneresis, the power consumption of the stirrer declined noticeably. About 30 minutes after the addition of the methanolic sodium hydroxide solution, the introduction of the steam was started (30 kg/h). The jacket temperature was increased stepwise to 60° C., then to 80° C., then to 90° C. and finally to about 100° C. To prevent the liquid level from falling too far as a result of methanol distilling off rapidly, three portions of 30 l of water each were fed in. After not more than 4 hours, the methanol was distilled off and the polyvinyl alcohol was completely dissolved.

After the stated procedure, a concentration of polyvinyl alcohol of between 25 and 30% was reached.

The product thus obtained had the following specifications:

| Specification | Value | Unit |
|---|---|---|
| Solid | 28.45 | % |
| Residual methanol content | 0.19 | % |
| Degree of hydrolysis (DH) | 98.5 | mol % |
| Ester number | 18.9 | mg KOH/g |
| Residual content of acetyl groups | 1.445 | % |
| Ash content (calculated as $Na_2O$) | 0.43 | % |
| Viscosity (4% strength in water) | 2.30 | mPa · s |

Example 3

The transparent and colorless polyvinyl acetate used had the following specifications:

Viscosity (10% strength in methanol): 1.72 mPa.s

| Molar mass (GPC): | $M_w$ = 20,320 g/mol |
|---|---|
| | $M_n$ = 8,560 g/mol |

Stirrer

Helical ribbon impeller with inner screw, d=11.2 mm, and bottom stirrer

| Vessel diameter (D): | 11.5 mm |
|---|---|
| Ratio: | d/D = 0.97 |

Product

Volume of fill 0.8 l

Solids content 35%

The container filled with 750 g of methanolic polyvinyl acetate solution was thermostated at 40° C. For the purpose of thorough mixing, the stirrer speed was 100 rpm with the introduction of 9.45 g of 10% strength methanolic sodium hydroxide solution. After 2 minutes, the stirrer speed was decreased to 80 rpm. The power consumption of the stirrer increased slowly and reached its maximum about 20 minutes after the addition of the methanolic sodium hydroxide solution. The temperature of the container was increased from the outside to 60° C. and was kept at this temperature. With the onset of syneresis, the power consumption declined noticeably. About 30 minutes after the addition of the methanolic sodium hydroxide solution, the introduction of the steam was started. The methanol was distilled off and the polyvinyl alcohol had completely dissolved after not more than 1.5 to 2 hours.

The product thus obtained had the following specifications:

| Specification | Value | Unit |
|---|---|---|
| Degree of hydrolysis (DH) | 98.4 | mol % |
| Ester number | 20.1 | mg KOH/g |
| Viscosity (4% strength in water) | 2.49 | mPa · s |

Example 4

A/Comparative Example 4 B

A transparent, colorless polyvinyl acetate solution having a viscosity of 1.70 mPa.s (15% strength in ethanol, measured according to DIN 53015) was divided into two equal portions. The first batch (EXPERIMENT A) was equipped with a helical ribbon impeller with inner screw (d=270 mm) and bottom stirrer in a vessel having a diameter (D) of 300 mm. The second batch (EXPERIMENT B) was equipped with a triple crossbeam stirrer (d=150 mm, height=30 mm) (ratio d/D=0.5).

The vessels in both experiments were filled with a 45% strength methanolic polyvinyl acetate solution and thermostated at 30° C. under nitrogen. The solution (17.5 kg) of each experiment contained 7.875 kg of polyvinyl acetate. Based on this solids content, 0.6% of sodium hydroxide (solid) and 3.325% of water (together as a 10% strength methanolic solution) were prepared as a catalyst solution and added in each experiment. For the purpose of homogeneous mixing, the stirrer speed was increased to 100 rpm for the duration of 2 minutes. Thereafter, the speed was reduced to 60 rpm for EXPERIMENT A and left at 100 rpm for EXPERIMENT B.

20 minutes after the addition of the catalyst solution, an increase in the viscosity was observed in both batches. While EXPERIMENT A was carried out to completion with an increase in the power consumption and it was not possible for a continuous gel phase to form, EXPERIMENT B showed a smaller increase in power consumption. However, a continuous gel phase was formed in EXPERIMENT B so that the batch was no longer completely stirred. The power consumption of the stirrer in EXPERIMENT B declined rapidly again to the original value. With the onset of syneresis, the power consumption of the stirrer in EXPERIMENT A declined again to the original level. Thirty minutes after the addition of the catalyst solution, the introduction of steam through a base valve was started. The reaction vessels were heated from the outside to 60° C.

After 95 minutes, a clear homogeneous solution was obtained in EXPERIMENT A. The average degree of hydrolysis of the polyvinyl alcohol was determined as 88.1 mol %.

After 120 minutes, EXPERIMENT B likewise gave a clear solution, which however contained many larger and smaller insoluble components. The analysis of the insoluble components showed that they contained polyvinyl alcohol with a degree of hydrolysis of about 95 mol %, whereas the average degree of hydrolysis of the dissolved polyvinyl alcohol from EXPERIMENT B was 88.4 mol %.

We claim:

1. A process for the preparation of polyvinyl alcohol which comprises reacting polyvinyl acetate in methanolic solution with methanolic sodium hydroxide at a temperature between 10° C. and 65° C. with stirring at a stirring speed of from 5 to 200 rpm with a stirrer which has a ratio of stirrer diameter (d) to container diameter (D) in the range of 0.6<d/D<0.999.

2. The process as claimed in claim 1, wherein the stirrer is selected from the group consisting of the helical ribbon impellers, anchor stirrers and multistage bar stirrers.

3. The process as claimed in claim 1, wherein the temperature during the reaction is between about 30° C. and about 60° C.

4. The process as claimed in claim 1, wherein the reaction takes place under atmospheric pressure.

5. The process as claimed in claim 1, wherein the amount of sodium hydroxide used is from about 0.05 to about 10% by weight, based on the polyvinyl acetate used.

6. The process as claimed in claim 1, wherein the solids content during the reaction is from about 1 to about 80% by weight.

7. The process as claimed in claim 1, wherein the weight average molar mass of the polyvinyl alcohol used is from about 1,000 to about 100,000 g/mol.

8. The process as claimed in claim 3, wherein the stirring speed is from about 30 to about 80 rpm.

9. The process as claimed in claim 1, wherein the ratio of stirrer diameter (d) to container (D) is in the range of about 0.85<d/D< about 0.95.

10. The process as claimed in claim 8, wherein the ratio of stirrer diameter (d) to container (D) is in the range of about 0.85<d/D< about 0.95.

11. The process as claimed in claim 1, wherein the sodium hydroxide is used in an amount of from about 0.1 to about 2% by weight, based on the polyvinyl acetate used and the molar mass of said polyvinyl acetate is in the range of about 1,000 to about 60,000 g/mol.

12. The process as claimed in claim 10, wherein the sodium hydroxide is used in an amount of from about 0.1 to about 2% by weight, based on the polyvinyl acetate used and the weight average molar mass of said polyvinyl acetate is in the range of about 1,000 to about 60,000 g/mol.

13. The process as claimed in claim 1, wherein the weight average molar mass of said polyvinyl acetate is in the range of about 2,000 to about 30,000 g/mol.

14. The process as claimed in claim 12, wherein the weight average molar mass of said polyvinyl acetate is in the range of about 2,000 to about 30,000 g/mol.

15. The process as claimed in claim 1, wherein the solids content during the reaction is from about 20 to about 80% by weight.

16. The process as claimed in claim 14, wherein the solids content during the reaction is from about 30 to about 60% by weight.

17. The process as claimed in claim 1, wherein said process is a one stage process.

18. The process as claimed in claim 17, wherein the reaction mixture is kept in motion so that a gel cannot form.

* * * * *